United States Patent [19]

Martin

[11] Patent Number: 4,686,683

[45] Date of Patent: Aug. 11, 1987

[54] LASER ANGULAR RATE SENSOR WITH DITHERED MIRRORS

[75] Inventor: Graham J. Martin, Canoga Park, Calif.

[73] Assignee: Litton Systems, Inc., Beverly Hills, Calif.

[21] Appl. No.: 789,480

[22] Filed: Oct. 21, 1985

Related U.S. Application Data

[63] Continuation-in-part of Ser. No. 569,079, Jan. 9, 1984, abandoned.

[51] Int. Cl.⁴ .................. H01S 3/083; G01B 9/02
[52] U.S. Cl. ........................... 372/94; 356/350
[58] Field of Search .................... 356/350; 372/94

[56] References Cited

U.S. PATENT DOCUMENTS

| | | | |
|---|---|---|---|
| 3,533,014 | 10/1970 | Coccoli et al. | 331/94.5 |
| 3,715,562 | 2/1973 | Dendy et al. | 235/156 |
| 4,152,071 | 5/1979 | Podgorski | 356/350 |
| 4,281,930 | 8/1981 | Hutchings | 356/350 |
| 4,410,273 | 10/1983 | Mantz et al. | 346/319 |
| 4,410,274 | 10/1983 | Ljung | 356/350 |
| 4,410,276 | 10/1983 | Ljung et al. | 356/350 |
| 4,422,762 | 12/1983 | Hutchings et al. | 356/350 |
| 4,526,469 | 7/1985 | Egli et al. | 356/350 |
| 4,529,311 | 7/1985 | Morgan et al. | 356/350 |

*Primary Examiner*—Gene Wan
*Attorney, Agent, or Firm*—Roy L. Brown

[57] ABSTRACT

A laser angular rate sensor has four corner mirrors forming a substantially square ring laser to reflect two counterpropagating laser beams around a closed path. Dither vibrators are interconnected to two consecutive mirrors in the path to oscillate perpendicularly to their mirror surfaces with 180 degree phase opposition. In one embodiment the mirror displacement is controlled to an amplitude of substantially 0.541 times the wave length of the laser light. In a second embodiment the mirror displacement amplitude is controlled to minimize the alternating component beat amplitude between one of the two laser beams and light scattered by the mirrors from the other beam. A microprocessor responsive to the output beat frequency of the ring laser gyro disconnects the dither drives when the amplitude of the input angular velocity to be measured exceeds a predetermined value greater than the maximum limit of the lock-in range of the gyro.

21 Claims, 4 Drawing Figures

LASER ANGULAR RATE SENSOR WITH DITHERED MIRRORS

CROSS REFERENCES TO RELATED APPLICATIONS

This a continuation-in-part of U.S. patent application Ser. No. 06/569,079, now abandoned, which was filed Jan. 9, 1984 by Graham J. Martin for a "Laser Angular Rate Sensor With Dithered Mirrors."

BACKGROUND OF THE INVENTION

1. Field of the Invention

The present invention relates generally to a laser angular rate sensor, and, more particularly, to an improved mirror mechanical oscillation technique, in such an angular rate sensor, for overcoming lock-in errors that occur during low angular rate sensing.

2. Description of Related Art

A laser angular rate sensor, or ring laser gyro, has two laser beams counterpropagating around a closed path by successive reflections from, typically, three or four mirrors. Upon rotation of the sensor about its sensing axis, the effective path lengths for the two beams are changed, producing a frequency difference between the counterpropagating beams which is proportional to the angular rotation rate. At low rotation rates where the frequency difference between the two laser beams would be expected to be small, it is found that the beams tend to "lock-in" or oscillate at the same frequency so that a frequency difference is not detected.

One technique, called "body dither," for eliminating lock-in has been to vibrate or dither the entire laser angular sensor about its sensing axis to raise low sensor rotation rates out of their lock-in range. Compensation for lock-in is not complete, and it may be undesirable to vibrate the entire sensor. For example, one undesirable effect of body dither when using three ring lasers in a guidance system is that vibration of one gyro may couple into another gyro.

One dither mechanism in U.S. Pat. No. 3,533,014 dithers each mirror of a three-mirror laser sinusoidally in a direction parallel to its reflective surface. The embodiment of this patent requires substantial shearing forces to dither the mirrors.

U.S. Pat. No. 4,281,930 describes a mechanism wherein all three mirrors of a three-mirror laser gyro are dithered perpendicularly to their reflective surfaces to maintain a constant cavity length. Vibrating the mirrors in this manner is easy, but unless a precise phase relation is held between the mirrors, the cavity length for the beams changes. The apparatus of this patent, therefore, needs a complex control system to eliminate the lockin phenomenon. It is difficult to remove light from the laser through mirrors covered with dither transducers.

In Oct. 1983, two U.S. patents were issued to Ljung. (U.S. Pat. No. 4,410,274 and U.S. Pat. No. 4,410,276). These patents describe a mechanism wherein two mirrors on a three-mirrored ring laser gyro are dithered one hundred and eighty degrees out-of-phase and show that transverse beam movement is produced on the third undithered mirror.

U.S. Pat. No. 4,410,274 describes a light path in an equilateral triangle. It shows that although dither perpendicularly to their surfaces of only two of the three mirrors produces backscatter shifts on all three mirrors, the amplitude of the dither cannot be adjusted to eliminate lock-in effects produced by all three mirrors. See column 2, line 47. The mechanism dithers its mirrors in a combination of directions both perpendicularly and parallelly to its mirror surfaces, simultaneously to eliminate lock-in effects from three mirrors. Accurate production of the required motion of the mirrors is very difficult. The tilted transducer stack suggested starting at column 9, line 23, tilts its attached mirror.

U.S. Pat. No. 4,410,276 pertains to a three-mirrored ring laser gyro with mirror motion only perpendicular to the mirrors. It specifies an optimum amplitude of mirror dither in an equilateral triangular laser to reduce but not eliminate mirror backscatter.

Secondly, U.S. Pat. No. 4,410,276 teaches an isosceles triangular laser of specific design with only two dithered mirrors. The teaching of equation 30 is in error, for equation 30 should read:

$$h \tan\theta \sin\theta \cos\theta / h \sin(90° - 2\theta) = (2.405/5.520)$$

which reduces to $(1 - \cos 2\theta)/2\cos 2\theta = 0.4357$. $\theta$ is the angle of incidence of the laser radiation on the two mirrors at the two equal base angles of the isosceles triangle, but in an isosceles triangle the angle of incidence on the third mirror is 90 minus $2\theta$, not $\theta$. The value of $\theta$ would, thus, be changed to 28.850 degrees, and the isoscels triangle would have base angles of 57.699 degrees. The apex angle would be 64.602 degrees. With Ljung's teaching, the amplitude of mirror motion needed to eliminate lock-in would be 0.910 times the light wavelength, and such a precise dither of the light wavelength at that large excusion of the driver is extremely difficult to achieve.

The apparatus discussed in U.S. Pat. Nos. 4,281,930 (Hutchings), 4,410,274 (Ljung) and 4,410,276 (Ljung) involve mirror movement which results in pure translational motion of the light path in the cavity. Thus it is possible to find a frame of reference in which an observer views the effects of these earlier dither motions as apparent transverse motion of the mirrors parallel to their reflecting surfaces with no overall translation of the light path. In this frame of reference the dither then becomes equivalent to the apparatus discussed in U.S. Pat. No. 3,533,014 (coccoli), and thus the expression for the modulation index in terms of the amplitude of mirror motion derived there will also apply.

SUMMARY OF THE INVENTION

For the apparatus of the invention, where two consecutive mirrors on a four mirrored cavity are dithered 180 degrees out-of-phase, the light path becomes distorted from a square shape existing before the dither is applied and as such cannot be transformed into a frame of reference in which only transverse mirror motion apparently exists. Thus, the analysis of the case at hand is substantially different from the previously mentioned patents and results in a different expression for the modulation index.

The laser angular rate sensor of the invention has four mirrors in a substantially square confi9uration to reflect two counterpropagating laser beams, from mirror to mirror, along the optical axis of a ring laser cavity.

Although a precisely square ring laser gyro is preferred, some deviation from such square configuration can be tolerated, and in fact a precisely square gyro probably is only mathematically conceivable. Deviation from the square configuration will give more than one value of side-band frequency produced between the forward and backscattered beams present with the mirror dither. With multiple side-band frequencies, there is no single value of mirror-dither amplitude that can remove all the contribution to the side band at zero input rotation rate.

Dithering means are connected to two consecutive mirrors in the laser path for oscillation of these mirrors with substantially identical amplitudes perpendicularly to the mirror surfaces with 180 degrees relative phase between the motion of the two consecutive mirrors to hold a constant cavity length. In one embodiment, the dithering means drive circuit is controlled in response to measured mirror displacement of both dithered mirrors to hold a predetermined dither amplitude, $A=0.541$ times the laser radiation wavelength. This amplitude corresponds to the modulation index, B, of the zeroth order Bessel function, $J_o(B)=0$, where the ring laser is square and $B = 2\pi$ A cosine $\theta/\lambda$.

In the equation, $\theta$ is the angle of incidence of the radiation at each of the four mirrors, (45 degrees) and $\lambda$ is the laser radiation wavelength.

When the ring laser is exactly square, although A is preferably 0.541 times the laser radiation wavelength, it may differ from that value. To the extent that it differs from that value, the effect of lock-in is not compensated. Implementing the precise 0.541 times the wavelength amplitude may require very precise machines and servomechanisms. As usual, there is typically an economic trade off between the cost of mechanizing the invention and the benefits accrued from the invention.

In a second embodiment, the amplitude of the dithering of the two consecutive mirrors is controlled or servoed to reduce the amplitude of the alternating component of a single one of the two counterpropagating beams.

In both embodiments, the dithering means drive circuit dithers the two consecutive mirrors when the angular rate of input to the gyro about its input axis is close to zero (i.e., in the lock-in band of the ring laser), but switches off at a predetermined angular input rate value greater than the upper limit of the lock-in band. Further, the dither frequency is sufficiently high, typically over 50,000 Hz, whereby the dithering is disconnected for angular input rates corresponding to a secondary lock-in band produced by the dithering itself.

The dithered mirrors are oscillated perpendicularly to their reflective surfaces without oscillation components parallel thereto.

The dithering of two mirrors leaves two mirrors stationary, of which one may be used for extraction of the ring laser gyro signal, and the other may be used for extraction of one of the counterpropagating signals for controlling the length of the laser cavity.

In the second embodiment of the invention, the backscattered light from the mirrors mixes with a primary one of the laser beams to produce an alternating component which is then used to control the dither amplitude of the two consecutive mirrors.

A square frame for carrying the square beam path of the ring laser of this invention is easier to fabricate than the prior art triangular ring laser frame.

It is therefore the object of this invention to dither two consecutive mirrors of a four-mirrored square ring laser of a ring laser gyro in a sinusoidal fashion to minimize the lock-in effects of the gyro.

DESCRIPTION OF PREFERRED EMBODIMENTS

Figure 1:
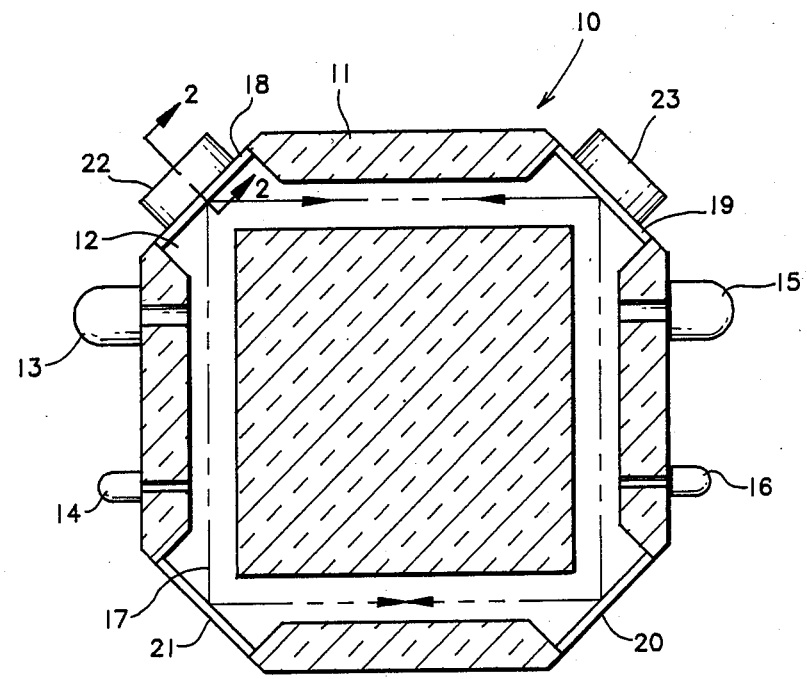
FIG. 1 is a sectional drawing of a square laser angular rate sensor with two consecutive dithered mirrors.

In FIG. 1, a laser angular rate sensor 10 has a, preferably one-piece, instrument block 11 forming a cavity 12, with a substantially square laser path, containing a laser gas mixture (typically neon and helium at a very low pressure—e.g. 3 torr) to support two counterpropagating laser beams 17. Cathodes 13 and 15 as well as anodes 14 and 16 are offset from but open to the beams 17 which are energized by voltages between the cathodes and anodes. The beams reflect from corner mirrors 18-21 to conterpropagate about the square cavity.

According to the invention, two consecutive mirrors 18 and 19 in the laser path 17 are dithered inwardly and outwardly in a substantially sinusoidal motion by piezoelectric oscillators 22 and 23, respectively, in directions perpendicular to their reflecting surfaces. When a mirror 18 or 19 has a curved reflecting surface, the mirror dither motion is along its optical axis. With a flat mirror, the optical axis is defined herein as perpendicular to the surface of the mirror.

Figure 2:
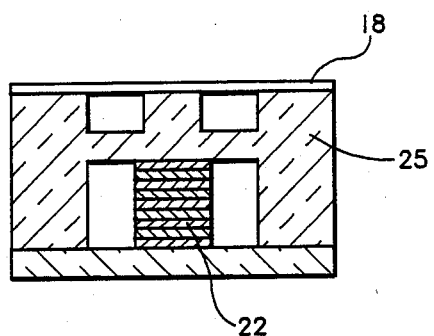
FIG. 2 is a sectional, elevational view of a single mirror and mirror-dithering means.

In FIG. 2, piezoelectric vibrator or oscillator 22 or 23 is fabricated of a stack of piezoelectric wafers that expand and contract in response to electrical potential differentials across their faces. Delivery of a cyclically changing voltage to the piezoelectric stack produces a cyclic lengthening and shortening of the stack which, through the vibrator housing 25 dithers the mirror 18 or 19. Alternatively the vibrator 22 or 23 may be a piezoelectric ceramic operating as a bimorph such as described in U.S. Pat. No. 4,383,763, CONTROLLABLE MIRRORS, by T. J. Hutchings, et.al.

Typically, in a ring laser gyro, a partly transmissive mirror 20 transmits the laser beams through mixing optics to photo detector means 26 to produce beat frequency signals whose frequency is equal to the difference in frequency between the two counterpropagating laser beams, and their frequency is a measure of the angular velocity of the gyro about its input axis. Signals from 26 are counted by a rate counter 27, producing information of the magnitude and the sign of the input rotation. The output of counter 27 is delivered to microprocessor 28, which is programmed to deliver a signal when the gyro measures a predetermined angular velocity greater than the upper limit of its lock-in band.

Figure 3:
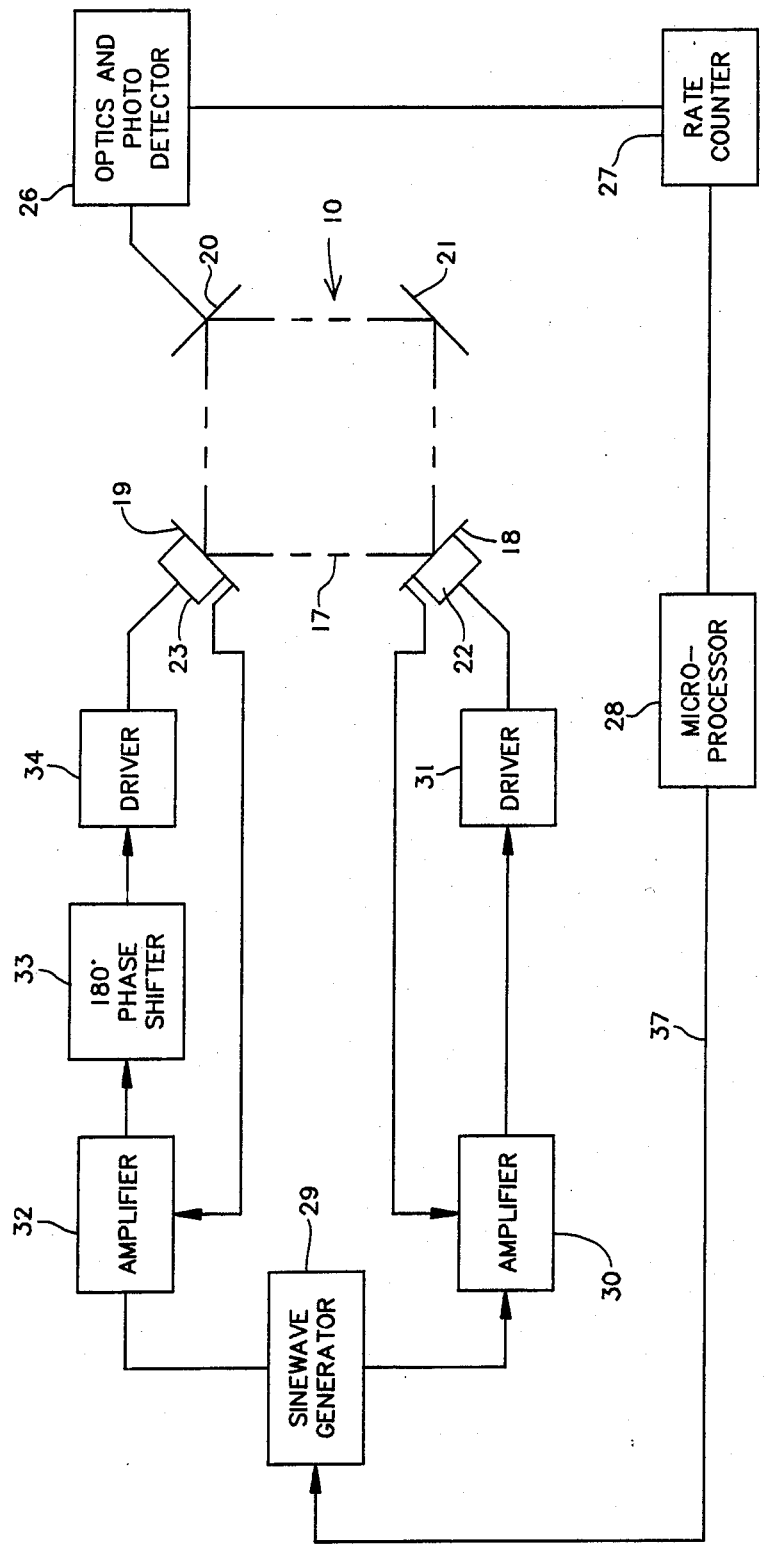
FIG. 3 is a block diagram of a first dither drive and control of two consecutive mirrors according to the invention.

In the embodiment of FIG. 3, a sinusoidal dither signal generator 29 delivers an alternating signal through a variable gain amplifier 30 and a driving amplifier 31 to vibrator 22, and through variable gain amplifier 32, phase shifter 33 and driving amplifier 34 to vibrator 23. Sensors (not shown) produce signals that are a measure of the displacement of the mirrors 18 and 19, respectively, and their signals are delivered back to the amplifiers 30 and 32, respectively, to cause the mirrors 18 and 19 to be controlled to track the signal of the generator 29 or its inverse. The two mirror vibrators 22 and 23 are driven at the same amplitude, but 180 degrees out of phase, to hold a constant cavity length during dither of the two laser beams. It must be noted that instead of using a phase shifter 33, the amplifiers 30 and 32 could be driven with opposite polarities. It should further be noted that inductive or capacitive effects could introduce phase errors, and it would then be necessary to correct those errors, for example, in the phase shifter 33.

The amplitudes of the drive signals from the generator 29 are preferably precisely scaled with a sinusoidal dither signal to cause the amplitudes of the dither of the oscillators 22 and 23 to be servo-driven to an amplitude of 0.541 times the wave length of the laser light. The amplitude of the dither is specifically chosen to a value wherein the Bessel function of the first kind of zero order of the modulation index is equal to zero.

The microprocessor 28 is programmed to deliver an enabling signal to the generator 29 when the ring laser gyro angular velocity to be measured is less than a predetermined amplitude. That predetermined amplitude lies between the maximum value of the primary lock-in range of the gyro and the minimimum value of the secondary lock-in range produced by the dithering itself. When the ring laser gyro angular velocity to be measured exceeds a predetermined amplitude greater than the maximum value of the primary lock-in range, the generator 29 is disabled, and the generator 29 delivers a zero or null signal to the amplifiers 30 and 32 to clamp the mirror and terminate the mirror dither. The dither frequency is chosen such that the generator 29 is disabled at an input angular velocity amplitude which is less than the lower limit of angular velocity corresponding to additional subordinate lock-in bands created by such dithering, particularly less than the band corresponding to the first harmonic of the dither frequency.

Figure 4:
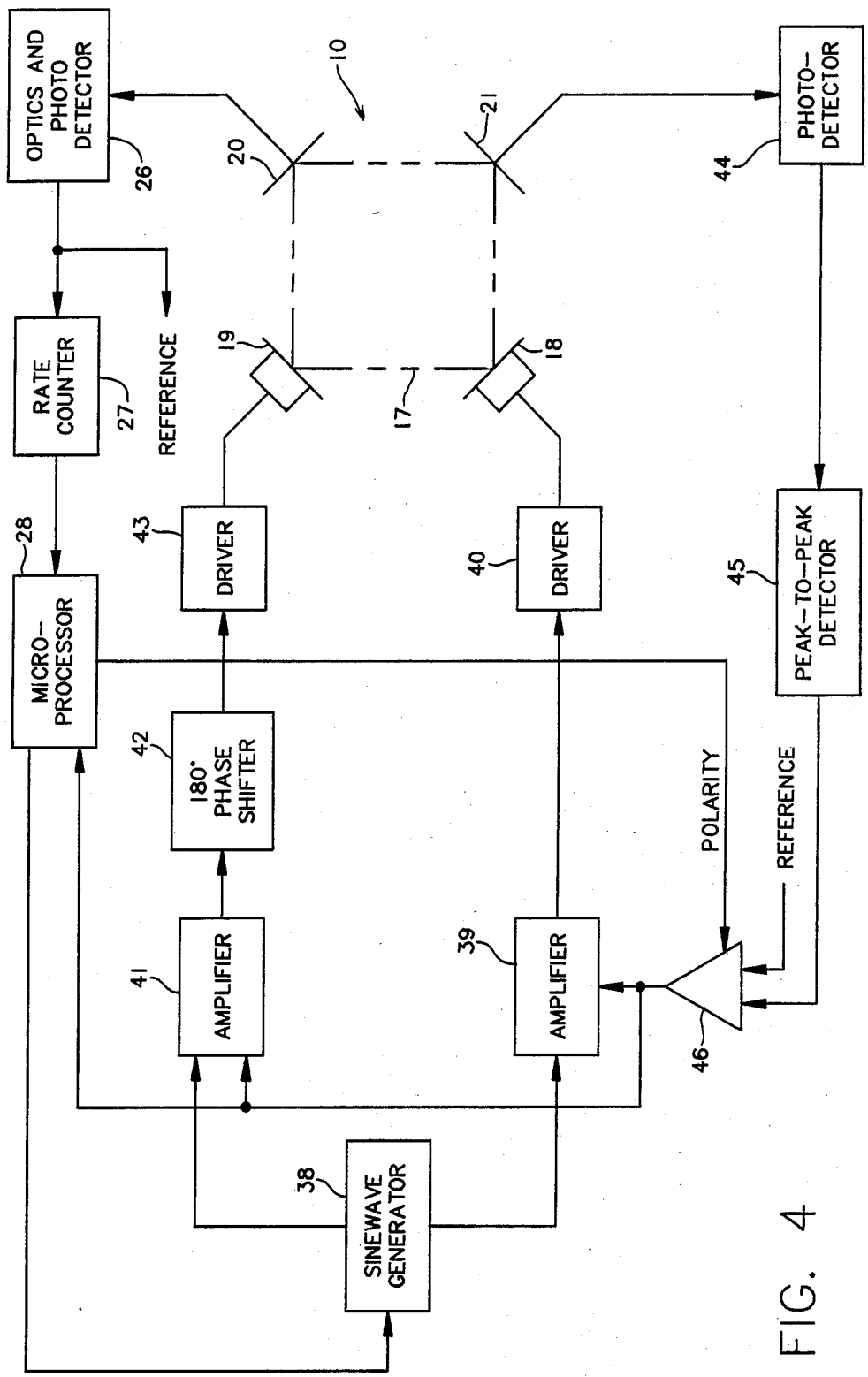
FIG. 4 is a block diagram of a second dither drive and control of two consecutive mirrors according to the invention.

FIG. 4 depicts a second version of a dither drive and control circuit. As in the first described embodiment of Figure 3, a sinusoidal dither generator 38 delivers a cyclic signal through amplifiers 39, 41, phase shifter 42, and through drivers 40 and 43 to dither the mirrors 18 and 19 inwardly and outwardly in phase opposition. It should be noted that rather than use a phase shifter 42, the amplifiers 39 and 41 could be driven in phase opposition. Further, the phase shift of phase shifter 42 can be adjusted to compensate for inductive and capacitive phase shifts.

Partly transparent mirror 21 delivers light from one of the counterpropagating laser beams to photo-sensor 44. Because of backscatter from the mirrors, the signal from photo-sensor 44 contains both a signal corresponding to the single beam intensity plus an alternating beat signal at the same heterodyne frequency as that produced by interference between the two primary counterpropagating beams. As the alternating component of the output of the photodiode 44 decreases, it is observed that the lock-in band also decreases. A peak-to-peak detector 45 detects the alternating component, and that component is used to drive or servo the amplitude of the the amplifiers 39 and 41.

The optics and photo detector 26 produces a beat signal between light from the two counterpropagating primary laser beams. That signal is used as a reference in amplifier 46, and it is of the same frequency as the beat signal at 44 produced by the interaction between one of the primary beams and the backscattered light from the other primary beam. Thus, the output of amplifier 46 is a measure of the amplitude of the alternating component in the signal from the photo detector 44. That alternating component, in turn, is a measure of the backscatter of the mirrors and the primary lock-in band.

Microprocessor 28 is also connected to receive the output of the amplifier 46. An increase in the output signal of amplifier 46 would increase the amplitude of the amplifiers 39 and 41 and the amplitude of the dithering of mirrors 18 and 19.

Should an increase of the amplitude of the output of amplifier 46 produce an increase of the amplitude of the output of the detector 45, the microprocessor 28 reverses the polarity of the amplifier 46. Further increase of the output of photo detector 44 decreases the output of amplifier 46 and the amplitude of dither of mirrors 18 and 19, thereby decreasing the output of the photo detector 44 and both the backscatter modulation and lock-in band toward zero.

Should a reduction of the amplitude of the output of amplifier 46 produce an increase of the amplitude of the output of the detector 45, the microprocessor 28 reverses the polarity of the amplifier 46. Further increase of the output of photo detector 44 increases the output of amplifier 46 and the amplitude of dither of mirrors 18 and 19, thereby decreasing the output of the photodetector 44 and both the backscatter modulation and lock-in band toward zero.

In the practice of the described invention, two immediately consecutive mirrors in a substantially square laser path of a ring laser gyro are substantially sinusoidally dithered at the same frequency and amplitude, but at a 180 degree phase relation, in directions perpendicular to their mirror planes, and along their optical axes.

Both versions automatically discontinue mirror dithering when the gyro input rate exceeds the primary lock-in range.

I claim:

1. In a ring laser angular rate sensor having a substantially square ring laser beam path about a sensing axis, including four corner mirrors, wherein first and second laser beams counterpropagate about said path, having means for extracting said counterpropagating beams and means for beating said extracted beams against each other, and further comprising processor means for converting the beat frequency so-obtained into a measure of angular velocity about said sensing axis, the improvement comprising:
    first and second vibrating means, attached to said mirrors, for substantially sinusoidally dithering first and second consecutive ones of said mirrors along their optical axes, to distort said ring laser beam path while holding constant the length of said path;
    drive circuit means, connected to drive said two vibrating means, for substantially sinusoidally energizing said first and second vibrating means, at the same mechanical frequency, in a 180 degree phase relationship, and to the same predetermined amplitude; and
    means for controlling said amplitude to minimize the lock-in effects of mirror backscatter upon the operation of said sensor.

2. A laser angular rate sensor as in claim 1, in which said improvement in said drive circuit means includes means responsive to said processor to interrupt the vibration of said first and second vibrating means when said angular rate sensor measures an angular input rate in excess of a predetermined maximum lock-in rate.

3. A laser angular rate sensor as in claim 2, in which the amplitudes of vibration of said first and second vibrating means are controlled to a value wherein the modulation index of said dithering amplitude corresponds to a zero of the Bessel's function of the first kind of zero order.

4. A laser angular rate sensor as in claim 3, in which the amplitudes of vibration of said first and second vibrating means are controlled to a value of substantially 0.541 times the laser beam wavelength.

5. A laser angular rate sensor as in claim 4 and further comprising means for clamping said vibrating means to hold the path length of said rate sensor during periods when said vibration is interrupted.

6. A laser angular rate sensor as in claim 3 and further comprising means for clamping said vibrating means to hold the path length of said rate sensor during periods when said vibration is interrupted.

7. A laser angular rate sensor as in claim 2 and further comprising means for clamping said vibrating means to hold the path length of said rate sensor during periods when said vibration is interrupted.

8. A laser angular rate sensor as in claim 1 and further comprising means for clamping said vibrating means to hold the path length of said rate sensor during periods when said vibration is interrupted.

9. A laser angular rate sensor as in claim 1, in which the amplitudes of vibration of said first and second vibrating means are controlled to a value wherein the modulation index of said dithering amplitude corresponds to a zero of the Bessel's function of the first kind of zero order.

10. A laser angular rate sensor as in claim 9, in which the amplitude of vibration of said first and second vibrating means are controlled to an amplitude substantially equal to 0.541 times the laser beam wavelength.

11. A ring laser gyro, comprising:
a ring laser gyro having a substantially square ring laser path with two laser beams counterpropagating about a measuring axis, including four corner mirrors, means for extracting light from said counterpropagating laser beams, means for beating said extracted beams to produce a difference frequency signal, and processing means for converting said difference frequency into a measure of the angular velocity of said gyro about its said measuring axis;
translation means for translating a consecutive two of said mirrors along only their optical axes;
means for substantially sinusoidally oscillating said translation means in phase opposition; and
means for controlling the amplitudes of oscillation of said translation means to maintain the laser path length of said gyro while minimizing the lock-in of said gyro caused by backscatter from said mirrors.

12. Apparatus as recited in claim 11 and further comprising position sensor means on said two consecutive mirrors; and
servo means connected between said position sensor means and said means for controlling to control the amplitude of vibration of said two consecutive mirrors to an amplitude wherein the modulation index of said dithering amplitude corresponds to a zero of the Bessel's function of the first kind of zero order.

13. Apparatus as recited in claim 12 in which said servo means controls the amplitude of vibration of said two consecutive mirrors to an amplitude of substantially 0.541 times the wave length of said laser beams.

14. Apparatus as recited in claim 13 and further comprising:
means for clamping said translation means to hold the length of the laser path of said gyro when said translation means ceases to oscillate; and
means for stopping the oscillation of said translation means when said measure of angular velocity is greater than a predetermined upper limit of the lock-in range of said ring laser gyro.

15. Apparatus as recited in claim 12 and further comprising:
means for clamping said translation means to hold the length of the laser path of said gyro when said translation means ceases to oscillate; and
means for stopping the oscillation of said translation means when said measure of angular velocity is greater than a predetermined upper limit of the lock-in range of said ring laser gyro.

16. Apparatus as recited in claim 11 and further comprising:
means for clamping said translation means to hold the length of the laser path of said gyro when said translation means ceases to oscillate; and
means for stopping the oscillation of said translation means when said measure of angular velocity is greater than a predetermined upper limit of the lock-in range of said ring laser gyro.

17. Apparatus as recited in claim 11 and further comprising means for sensing the alternating component in a single one of said counterpropagating beams; and
servo means for controlling the amplitude of oscillation of said translation means in a direction to reduce said alternating component.

18. Apparatus as recited in claim 17 and further comprising:
means for clamping said translation means to hold the length of the laser path of said gyro when said translation means ceases to oscillate; and
means for stopping the oscillation of said translation means when said measure of angular velocity is greater than a predetermined upper limit of the lock-in range of said ring laser gyro.

19. A ring laser gyro comprising:
means forming a closed loop optical cavity containing an active lasing medium for generating counterrotating laser beams in a substantially square path therein, a processor for producing an angular velocity signal responsive to the frequency difference between the laser beams, such angular velocity signal being a measure of the rate of rotation of the ring laser gyro, said cavity forming means including four corner mirrors; and
means for vibrating two consecutive ones of said mirrors at the same frequency, each in a direction only along its optical axes, to distort the paths of said beams, the relative phase of vibration between the two mirrors being adjusted to cause the total distance around said closed loop to remain constant.

20. A laser angular rate sensor as in claim 19, in which the amplitudes of vibration of said first and second vibrating mirrors are controlled to a value wherein the modulation index of said dithering amplitudes correspond to a zero of the Bessel's function of the first kind of zero order.

21. Apparatus as recited in claim 20 in which the amplitude of said vibration is servoed to be substantially 0.541 times the average laser wavelength of said ring laser gyro, said processor controlling said vibration to cease when said measured angular velocity exceeds a predetermined value greater than the maximum lock-in limit of said gyro and less than the minimum secondary lock-in band limit caused by the vibration itself.

* * * * *